INVENTORS
GENE M. AMDAHL
EDWIN D. COUNCILL
ROBERT J. FLAHERTY
JOSEPH J. ZAGURSKY
BY Carl C. Kling
ATTORNEY

MEMORY PROTECTION SYSTEM

Filed Dec. 31, 1963 2 Sheets-Sheet 2

United States Patent Office 3,328,765

Patented June 27, 1967

3,328,765
MEMORY PROTECTION SYSTEM

Gene M. Amdahl, Poughkeepsie, Edwin D. Councill, Wappingers Falls, Robert J. Flaherty, Pleasant Valley, and Joseph J. Zagursky, Wappingers Falls, N.Y., assignors to International Business Machines Corporation, New York, N.Y., a corporation of New York Filed Dec. 31, 1963, Ser. No. 334,714
6 Claims. (Cl. 340—172.5)

This invention relates generally to electronic data handling apparatus and more particularly to a system to protect addressable storage locations therein from improper use.

Electronic data handling apparatus utilizes a memory for storing data. A memory usually comprises a plurality of addressable storage locations, each adapted to store an item of data generally called a word, in the form of a plurality of binary bits. Each word location has an address which defines its position in the memory and access to that location for the purposes of storing a word therein or reading out a word previously stored is gained by specifying the proper address along with a command or instruction specifying the operation to be performed at the specified address. It often happens that there may be stored in memory two or more independent programs at the same time. These programs may be operated at different times by one or by different persons. There may be interference between two programs whereby one program may cause changes or deletions of information stored for use under another program. It might be, for instance, that one program would call for storage of information in a block of memory registers overlapping a block already in use and containing information intended for use with the other program. The present invention provides a system whereby such interference is prevented. To better illustrate this concept, let us consider the following situation:

For the purpose of simplicity, let it be assumed that programs A and B designed to be noninterfering are stored in the main memory. It is intended then that during the operation of program A only those locations assigned to program A be accessed and that words at these locations be altered or not only in accordance with program A. The same is true of program B. If through some error, possibly a programming error, during the operation of program A a location assigned to program B is accessed, means must be provided to prevent the alteration of the word stored in this program B location by the execution of program A. It is precisely to such a means that this invention is directed. For the purposes of this specification and claims, it should be considered that the main memory is effectively divided into a plurality of blocks, each of the blocks comprising a plurality of words. Under the influence of the master control program, a plurality of blocks may be assigned to a particular program.

With the above in mind it may be stated that the main object of the present invention is, in general, achieved in accordance with the present invention by providing an electronic data handling apparatus comprising a main memory for storing blocks of words therein, each block being associated with a particular program to be executed by said apparatus, an auxiliary memory, means to store in said auxiliary memory individual first codes identifying each of said blocks of words, means to access a word in said main memory, means responsive to accessing of said word to access the first code associated therewith, means to store a second code indicative of the program under execution by said apparatus, means to monitor said first and second codes and means responsive to said monitoring to control the alteration of said accessed word. More specifically, the present invention provides an X–Y select memory comprising a main memory and an auxiliary memory, said auxiliary memory comprising a matrix of cores divided into groups, one group for each block of words in main memory, each group storing a first code identifying the program to which its associated block has been assigned, means to store a second code identifying the program currently being executed, means to access a word in main memory and to simultaneously access the group of cores associated with said word to (1) read out the first code from said group of cores and (2) read out the accessed word, means to compare said first and second cores and means responsive to a favorable or an unfavorable comparison therebetween to control the alteration of said accessed word. Provided a favorable comparison is indicated, the accessed word may be altered by the program. If an unfavorable comparison is indicated, the accessed word is protected against such alteration and is effectively restored in its original location in main memory.

It is therefore the main object of the present invention to provide a memory protect feature for electronic data handling apparatus whereby addressable locations in the apparatus memory are protected from improper use.

More specifically, it is an object of the present invention to provide a system whereby interference between various programs simultaneously stored in memory may be prevented.

Another object of the present invention is to provide means in such a system whereby the protective feature is achieved by a code comparison scheme in which accessing a word in memory generates a code associated therewith which code is compared with a code identifying the program currently being executed and the result of said comparison controls the alteration of said accessed word.

Another object of the invention is to accomplish the memory protection function without sacrifice of memory speed.

These and other objects of this invention will become apparent from a more detailed description of the accompanying drawings.

Figures 1, 2:
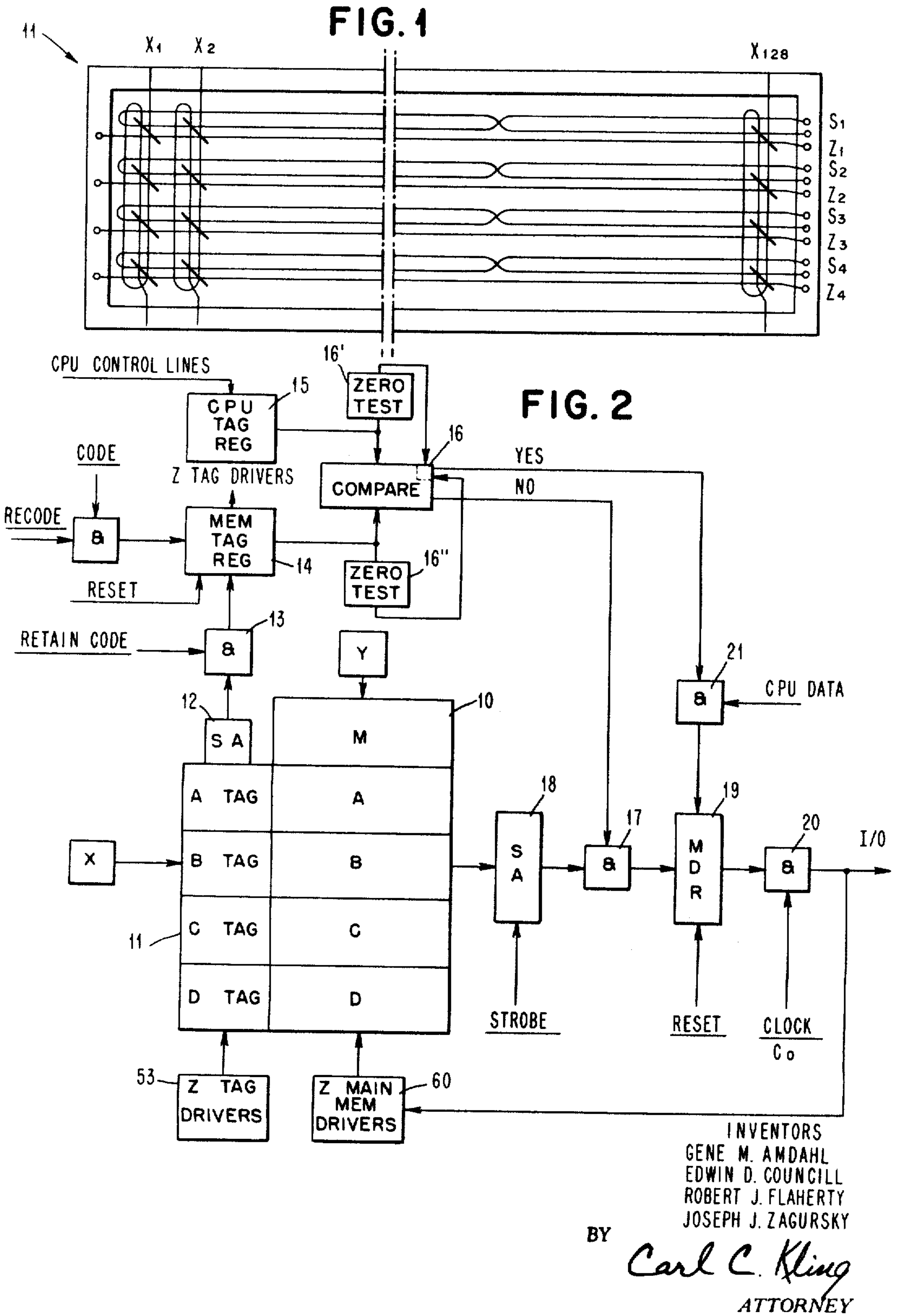
FIGURE 1 is a view of a special core plane comprising a plurality of groups of cores each of the groups storing a code or tag associated with a particular coordinate of main memory.
FIGURE 2 is a diagrammatic representation of the means by which the memory protection feature is achieved in accordance with the present invention.

Referring to FIGURES 1 and 2, there is shown in diagrammatic form an X–Y select main memory 10, which may be in the form of a three-dimensional core array, together with a special core plane 11. It should be understood that for the purposes of illustration only the diagrammatic representations of the three-dimensional core array 10 the X, Y and Z drivers and peripheral circuitry associated therewith are shown. Reading and writing into the memory is done in conventional fashion except for those provisions which are essential to the memory protection feature. A conventional pulse program uses a "staggered read" feature in which the X pulse is applied earlier than the Y pulse. The special core plane 11 is shown in association with the X drive conductors of the main memory 10 in FIGURE 2. Referring to FIGURE 1, there is shown a more detailed illustration of this special core plane.

In FIGURE 1, it may be assumed that the three-dimensional matrix is effectively a 128 by 256 by 36 array, the 128 being along the X coordinate and the 256 along the Y coordinate and the 36 along the Z coordinate. Such an array may store 32,768 words (128 times 256), each word having 36 bits. The memory would then have 32,768 word addresses. Each X coordinate would be common to 256 word addresses. In FIGURE 1, the X coordinate lines are identified from $X_1$ through $X_{128}$. The special core plane is to store memory tags. These tags will be in the form of individual four bit codes. Each X line in this special core plane is associated with four cores. Taking the $X_1$ line for example, a particular binary code or memory tag will be stored in the four cores associated therewith and consequently each of the 256 word addresses associated with the $X_1$ line will therefore be associated with this same four bit binary code. For simplicity sake let it be assumed that the master control program which is stored in section M (see FIGURE 2) of main memory has assigned the $X_1$ and $X_2$ word addresses (512 word addresses in all) to program A. Again in FIGURE 2, program A is shown as stored in the block identified by A. Means are provided for storing in the four cores associated with the $X_1$ line and the four cores associated with the $X_2$ line the same four bit binary code. During the execution of program A, block A will be accessed by coordinate addresses including various Y lines and the $X_1$ or the $X_2$ lines. When block A is accessed during the execution of program A, a word address in block A is accessed and the four bit code associated with program A is read out from the special core plane. Note the fact that all of the X lines in the special core plane are threaded back through the four cores. These $X_1$ lines carry one-half select current which by virtue of this threading provides full select current to the four cores in the special core plane and half select current for main memory. The four bit code is read out to the sense amplifiers 12 and the gate 13 to the memory tag register 14, at X pulse time, slightly earlier than the readout of the main memory, which occurs at Y pulse time. The sense lines associated with the cores in the special core plane are identified as $S_1$, $S_2$, $S_3$ and $S_4$. During the execution of program A, the CPU stores in the CPU tag register 15 the code or tag which has been assigned to program A. The contents of registers 14 and 15 are monitored by compare circuit 16, zero test circuit 16' and zero test circuit 16". The zero test circuits may be as simple as AND circuits. If the tag stored in register 14 is the same as that stored in register 15 the compare circuit indicates a favorable comparison which here is identified as YES. If the tag stored in register 15 is zero, or if the tag stored in register 14 is zero, comparison is unnecessary and the YES signal is forced. If the comparison is unfavorable, it is indicated here as NO. Let us assume, for instance, that during the execution of program A an X line is addressed which is associated with blocks B. This would result in storage in memory tag register 14 of the code associated with block B in memory 10 which of course is different than the code associated with block A stored in register 15. Consequently, there would be a NO answer given by the comparison circuit 16. This would condition gate 17 and decondition gate 21. The word accessed in memory 10 would then be gated from the sense amplifier 18 at strobing time to the memory data register 19. The contents of register 19 then would be gated out by gate 20 at $C_0$ time, causing the Z drivers 60 to restore the erroneously accessed word in the addressed word location at write time. Therefore, the accessed word under these conditions would not be altered but would be protected from alteration. If, however, during the execution of program A, the $X_1$ lines were accessed, the proper tag for program A would be read out to the memory tag register 14 and the comparison circuit 16 would provide a YES answer. This, then, would condition AND gate 21 and decondition AND gate 17. Now, under these circumstances, it is seen that the word which is accessed is blocked at strobing time by AND gate 17 and the CPU data is gated through AND gate 21 to MDR 19. At $C_0$ time this CPU data is read back into the accessed word location and consequently the previous information stored therein is altered.

Thus, the overall general operation of the system is achieved as explained above. The main object of the invention is to prevent interference between two programs. The block M of main memory 10 is used to identify the memory registers which store the master control program. If programmer A requires ten blocks of registers for the execution of program A, master control will assign ten unsued blocks and will in addition assign to this program an unused code or tag. Then, under control of master control, a store tag instruction is executed. This is best illustrated by FIGURE 2. The gate 22 is conditioned by a RECODE signal and the gate 15 is deconditioned by a RETAIN CODE signal, both signals being generated responsive to this instruction. All of the X lines associated with block A are sequentially addressed along with any Y line also associated with block A. On the read cycle, one-half selected read current supplied to the $X_1$ line results in full select current being applied to the four cores associated therewith. This causes read out of any previously stored code in these four cores, if any, which code or tag is sensed by the sense lines $S_1$–$S_4$ and supplied to the sense amplifiers 12. However, AND gate 13 blocks this code from the memory tag register because the RETAIN code line is down. Effectively then these four cores have been reset. Since gate 22 is conditioned, the code or tag supplied by the CPU to gate 22 is gated into the memory tag register 14. On the write cycle, the contents of register 14 are stored in these four cores through the functioning of the Z drivers 53. Since during write time the current on the $X_1$ line is full select write current, the Z drivers effectively function to provide inhibit current or no current as the case may be, depending on whether a 1 or 0 is to be stored in a given core. Each one of the X lines associated with program A and with block A are similarly addressed until all of these X lines store the code assigned to program A. The same is done for the other programs B, C, and D. Of course, the memory tag register 14 is reset after the execution of the store tag instruction associated with a given program.

Figures 3, 4:
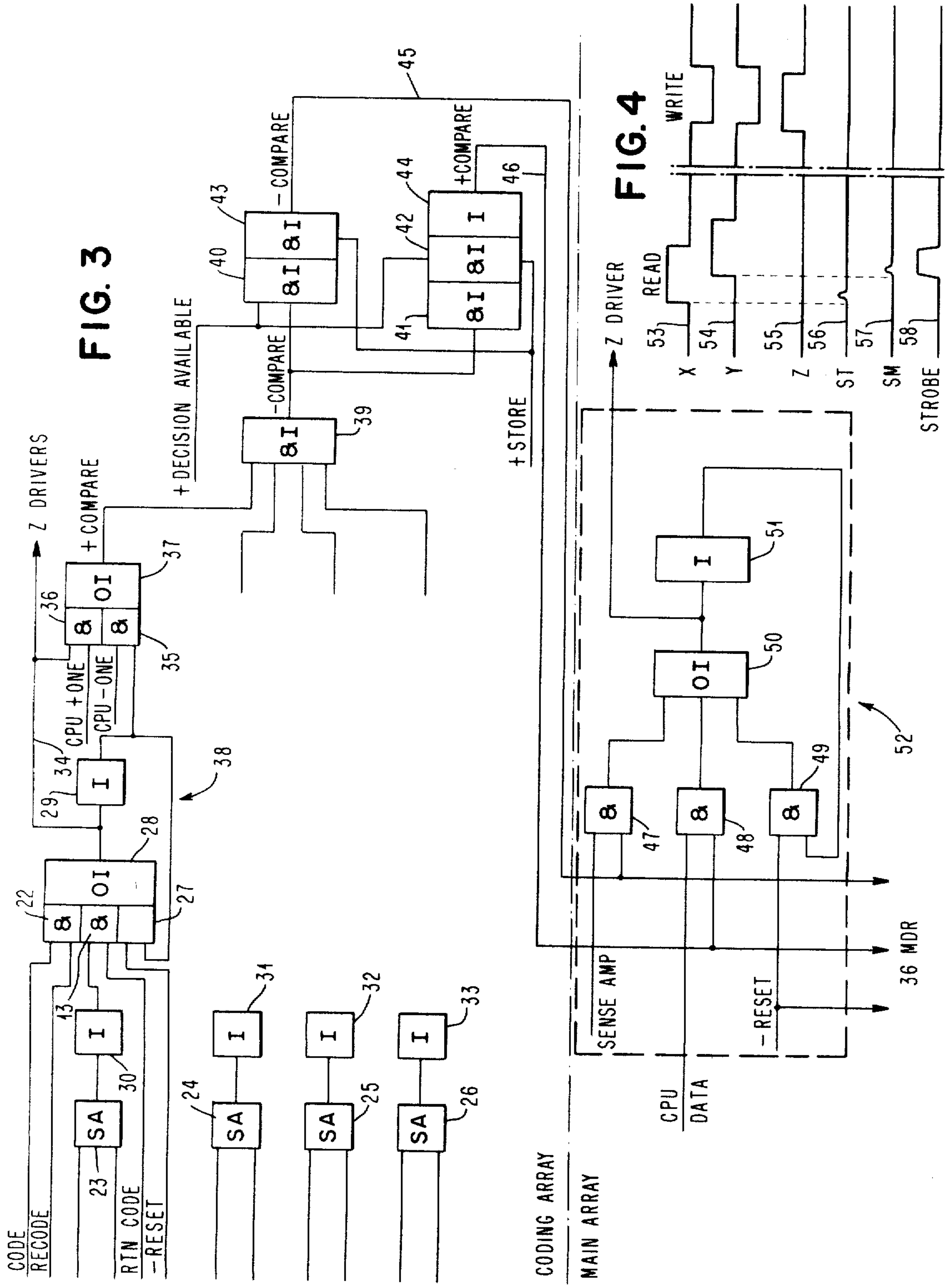
FIGURE 3 is a diagrammatic representation showing more specifically the code comparison feature and memory protection feature constructed in accordance with the present invention.
FIGURE 4 is a waveform chart showing basic timings.

Reference is now made to FIGURE 3 to show in more detail the means by which the CPU tag and the memory tag are compared and the results of this comparison on the memory data register (MDR). In discussing the logic associated with this circuitry, it will be assumed that binary ones give a plus voltage and binary zeros a minus voltage. In this figure, the four sense amplifiers 23–26 are those which are identified by numeral 12 in FIGURE 2. Each of the four stages in the memory tag register 14 of FIGURE 2 includes as shown in FIGURE 3 the three AND gates 22, 13 and 27. AND gate 27 is not shown in FIGURE 2 but it is of course associated as can be seen here with the RESET line. To reset any particular stage in the memory tag register the RESET line is driven minus. During a RECODE mode, AND gate 22 is conditioned by the RECODE signal to admit on the CODE line the bits supplied by the CPU. As previously explained during this RECODE mode, the memory tag register stores the tag which is to be stored in the respective X lines in the special core plane. During the RETAIN code mode, the RETAIN code line conditions AND gate 13 to permit entry into the memory tag register of the code or tag read out from an accessed X line and stored in the four cores associated with that line in the special core plane. 28 is a logical block which functions as an OR-INVERT circuit. Its output is minus when any one of the AND gates 13, 22 and 27 are unblocked and plus when all of these gates are blocked. The AND gates of course provide plus outputs therefrom only when a coincidence of plus inputs are provided thereto. If, now, we assume a one input to sense amplifier 23, the output therefrom will be minus to the inverter 30 which provides at the output a plus to condition AND gate 13. If we are in the retain code mode then AND gate 13 is unblocked to provide a plus input to block 28. The output from the OR-INVERT 28 is then minus. Connection through line 34 is made to the appropriate Z driver 53 associated with a special core plane. At write time then this particular Z driver will restore a one back in the associated core in the special core plane. The output from inverter 29 is plus which in cooperation with the reset line being a plus unblocks AND gate 27 to latch this particular stage in the one state.

The compare circuit 16 of FIGURE 2 essentially consists of two AND gates 35 and 36, their outputs being connected to the input to the OR-INVERT circuit 37. Assuming that the latch 38 stores a one and the corresponding stage of the CPU tag register 15 is a one, then it can be seen that AND gate 36 is blocked as is AND gate 35. The CPU tag register 15 consists of four stages each having complementary outputs therefrom. Consequently if a particular stage stores a one, AND gate 36 is conditioned and if it stores a zero, AND gate 35 is conditioned. Under the circumstances which we are assuming here, that is, a one from the register 15 and a one from the register 14, then both gates 35 and 36 are blocked. The output from these gates provides a negative input to 37 and a plus output therefrom. Consequently, when a comparison between two digits provides a favorable comparison, the output from 37 will be plus. Assuming now that there is a favorable comparison from all four stages of the registers 14 and 15, it can be seen that AND-INVERT circuit 39 will provide a minus output therefrom. The output from 39 is fed to the inputs to the AND-INVERT circuits 40 and 41. Under the control of the CPU, the decision available and store signals are generated to raise their respective lines. The decision available line is fed to the input to circuit 40 and the input to AND-INVERT circuit 42. The store signal is fed to the inputs to circuits 42 and 43. Assuming now a favorable comparison and therefore the output of 39 is minus, it can be seen that the outputs from circuits 40 and 41 are both plus. The output from AND-INVERT 43 will be minus, the output from circuit 42 will be minus and the output from inverter 44 will be plus. Consequently, when all four bits of the memory tag compare favorably with all four bits from the CPU tag, the output on line 45 will be minus and on 46 will be plus. AND gate 47 will be blocked and AND gate 48 will be conditioned. AND gates 47, 48 and 49 together with OR-INVERT 50 and INVERT 51 comprise each stage of the memory data register 19. There are for a 36 bit word, 36 such stages. Shown here in this figure is simply one stage which can accommodate one bit of the 36 supplied from the sense amplifier output of the memory 10 or one bit of the 36 data bits supplied by the CPU. AND gate 37 corresponds to AND gate 17 in FIGURE 2 and AND gate 48 corresponds to AND gate 21 in FIGURE 2. Again, the reset line goes negative on reset and is supplied to AND gate 49. The reset line here is the same as the reset line to the MDR in FIGURE 2. Therefore, under these conditions, that is, a favorable comparison, AND gate 48 is unblocked so that the memory data register 19 of FIGURE 2 stores the CPU data. Each stage is essentially a latch which is similar to the latches which comprise the stages of the memory tag register, one stage of which is identified at 38 in this figure. When this particular latch 52 in the MDR stores a one, the output from INVERT 51 is a plus and the input thereto is a minus. The Z driver which is connected to the line between circuits 50 and 51 is one of the Z drivers associated with the drivers in FIGURE 2. The Z driver lines such as line 34 associated with the memory tag register is one of the Z drivers 53 associated with the special core plane.

If any bit postion in the comparison circuit gives an unfavorable comparison, gate 47 is unblocked and gate 48 is blocked. The accessed word from memory 10 is then gated into MDR and finally restored back into the accessed location in memory.

FIGURE 4 shows the timings for memory operation. Normal read selection in main memory is by an X half select pulse on line 53 followed after a small delay by a Y half select pulse shown on line 54. Normal write selection is by write half select pulses shown on lines 53 and 54 and a coincident inhibit half select pulse shown on line 55, applied selectively to control the 1 or 0 value.

During the read operation, the X read half select pulse alone, because of the two turns, is sufficient to provide output from the auxiliary memory, as shown on line 56. The later applied Y read half select pulse completes selection of the word in main memory to provide output as shown on line 57. A strobe timing as shown on line 58 is useful in defining main memory output signals over memory noise.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An electronic data handling apparatus comprising a main memory for storing blocks of words therein and including a plurality of X and a plurality of Y drive lines, one of said plurality of drive lines for accessing blocks of words and the other for accessing words within said blocks, each block being associated with a particular program to be executed by said apparatus, an auxiliary memory including a plurality of groups of cores, each group being traversed by one of said one plurality of drive lines and each of said groups storing individual first codes each identifying a block of words whereby accessing word in said main memory accesses a group of cores associated therewith to read out said accessed word and said first code, means to store a second code identifying the program being executed by said apparatus, means to access a word in said main memory, said access means energizing one of said drive lines slightly ahead of the other whereby said first code is read out ahead of a word in said main memory means to compare said first and second codes and means responsive to said comparison to control the alteration of said accessed word.

2. An electronic data handling apparatus comprising an X–Y select main core memory for storing blocks of multi-bit words therein, each block being associated with a particular program to be executed by said apparatus, a plurality of X and a plurality of Y drive lines, one of said plurality of drive lines for accessing blocks of words and the other for accessing words within said blocks, an auxiliary memory including a plurality of groups of cores each group being traversed by one of said plurality of drive lines and each of said group storing individual first codes each identifying a block of words, means to access a word in said main memory and the first code associated therewith by selection of the X–Y coordinate drive lines for said word, said access means energizing one of said drive lines slightly ahead of the other whereby said first code is read out ahead of a word in said main memory a multi-bit data register for storing said accessed word, a gate controlling the entry of said accessed word into said register, means to store a second code identifying the program being executed by said apparatus, means to compare said first and second codes and means responsive to said comparison to control the operation of said gate.

3. An electronic data handling apparatus as claimed in claim 2 further including a second gate, a source of multi-bit data, said second gate controlling the storage of said multi-bit data in said register, said means responsive to said comparison of said first and second codes energizing one of said gates and de-energizing the other of said gates to control the storage in said register of said multi-bit data or said accessed word.

4. Apparatus as claimed in claim 2 wherein each of said drive lines is twice threaded through its associated group of cores.

5. Apparatus as claimed in claim 2 further including a register to store said accessed first code.

6. An X–Y select memory comprising a main memory and an auxiliary memory, said auxiliary memory comprising a matrix of cores divided into groups, one group for each block of words in main memory, each group storing a first code identifying the program to which its associated block has been assigned, means to store a second code identifying the program currently being executed, means to provide a first half select current to a block of words in main memory and to simultaneously provide full select current to the group of cores associated with said word to read out the first code from said group of cores, means to provide a second half select current, slightly delayed from said first half select current, which together with said first half select current is effective to read out the accessed word, means to compare said first and second codes, and means responsive to a favorable or an unfavorable comparison therebetween to control the alteration of said accessed word.

References Cited

UNITED STATES PATENTS

| | | | |
|---|---|---|---|
| 2,948,885 | 8/1960 | Stuart-Williams | 340—174 |
| 3,016,521 | 1/1962 | McGuigan | 340—174 |
| 3,049,692 | 8/1962 | Hunt | 340—146.1 |
| 3,069,658 | 12/1962 | Kramskoy. | |
| 3,108,256 | 10/1963 | Buchholz et al. | 340—172.5 |
| 3,108,257 | 10/1963 | Buchholz | 340—172.5 |

FOREIGN PATENTS

| | | |
|---|---|---|
| 3,114,049 | 9/1961 | Germany. |

OTHER REFERENCES

King: "Data Storage System," IBM Technical Disclosure Bulletin 3–1962, vol. 4, No. 10.

ROBERT C. BAILEY, *Primary Examiner.*

O. E. TODD, P. L. BERGER, *Assistant Examiners.*